Oct. 13, 1925.

F. A. REECE

1,556,630

THREAD TRIMMING DEVICE FOR BUTTONHOLE SEWING MACHINES

Filed June 14, 1919   6 Sheets-Sheet 1

Inventor.
Franklin A. Reece
by Heard Smith & Tennant
Atty

Inventor.
Franklin A. Reece
by Heard Smith & Tennant.
Attys.

Oct. 13, 1925.                                                                                1,556,630
F. A. REECE
THREAD TRIMMING DEVICE FOR BUTTONHOLE SEWING MACHINES
Filed June 14, 1919                          6 Sheets-Sheet 5

Inventor.
Franklin A. Reece
by Heard Smith & Tennant.
Attys.

Inventor.
Franklin A. Reece
by Heard Smith & Tennant
Attys.

Patented Oct. 13, 1925.

1,556,630

UNITED STATES PATENT OFFICE.

FRANKLIN A. REECE, OF CHESTNUT HILL, MASSACHUSETTS, ASSIGNOR TO THE REECE BUTTON HOLE MACHINE COMPANY, OF BOSTON, MASSACHUSETTS, A CORPORATION OF MAINE.

THREAD-TRIMMING DEVICE FOR BUTTONHOLE-SEWING MACHINES.

Application filed June 14, 1919. Serial No. 304,224.

*To all whom it may concern:*

Be it known that I, FRANKLIN A. REECE, a citizen of the United States, residing at Chestnut Hill, county of Middlesex, State of Massachusetts, have invented an Improvement in Thread-Trimming Devices for Buttonhole-Sewing Machines, of which the following description, in connection with the accompanying drawing, is a specification, like characters on the drawing representing like parts.

This invention relates to buttonhole sewing machines and particularly to a device for cutting the threads at the completion of the buttonhole and for holding the severed ends until the stitching on the next buttonhole has been started.

One of the objects of the invention is to provide a novel means by which both the upper and the under thread are cut and clamped simultaneously at the end of the stitching operation. The advantage of this is that the strain on the threads due to the cutting and clamping operation will be applied to both threads at the same time, so that the point where the threads interlock in the last stitch will not be pulled out of its normal position by a greater strain on one thread than on the other.

Another object of the invention is to provide a novel under-thread-cutting device arranged to cut the under thread close to the work at the end of the stitching operation and hold the cut end until the next stitching operation is commenced, and immediately before cutting the thread, to pull off from the source of supply a length of under thread just sufficient to form the first stitch when the sewing machine is set in operation again, said device so manipulating the under thread that there will be no extra length which results in thread ends projecting from the buttonhole when the latter is completed.

Another object of the invention is to provide a novel mechanism by which when the sewing machine is started the take-up operates first to pull off from the source of supply a length of upper thread sufficient to form the first stitch while the end of said thread is held in the thread-holding device thereby avoiding the necessity of providing a special pull-off for the upper thread.

Another object of my invention is to provide a novel thread-trimming mechanism in which the thread-trimming movement of the cutting elements is a positive movement as distinguished from a spring-actuated one.

Another object of the invention is to provide a novel arrangement by which the thread-trimming device is positively actuated from a driving element which is separate from that which operates the stitch-forming mechanism and which is automatically set in operation by the operation of stopping the stitch-forming mechanism at the end of the buttonhole.

Other objects of my invention are to improve thread-trimming devices of this nature, all as will be more fully hereinafter set forth.

While my improved thread-trimming device is capable of use in connection with different types of sewing machines, I have for the purpose of illustration shown it as applied to a buttonhole sewing machine such as illustrated in my copending application Se. No. 280,704, filed March 5, 1919.

Figures 1, 14, 15, 16:
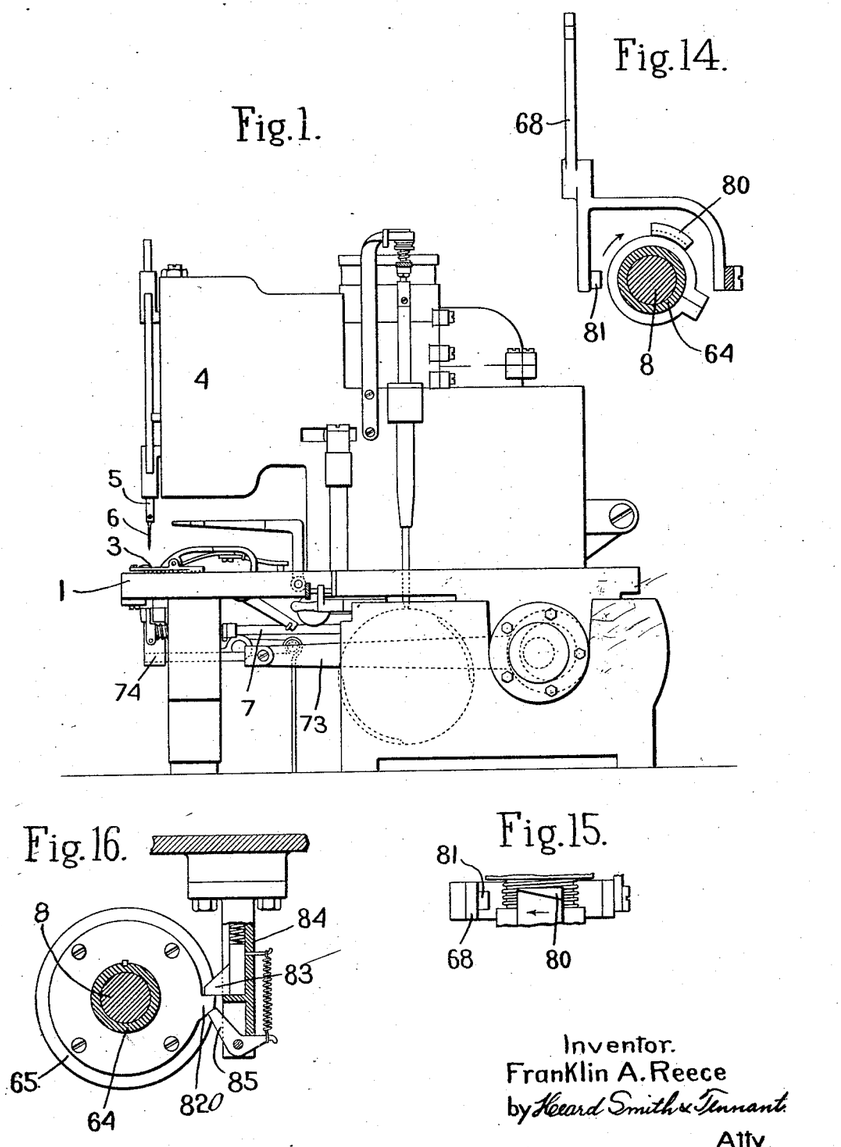
Fig. 1 is a side view of a sewing machine such as illustrated in my said application and having my improvements applied thereto.
Fig. 14 is a view on substantially the line 14—14, Fig. 2, showing the cam for disconnecting the driving clutch for the thread trimmer.
Fig. 15 is a fragmentary view of the above-mentioned cam.
Fig. 16 shows the stop mechanism for said clutch.

As stated above, I have illustrated my improved thread trimmer as it might be applied to a buttonhole sewing machine of the type shown in my co-pending application, Se. No. 280704 and in Fig. 1 which shows a side view of a buttonhole sewing machine of this type, 1 indicates the bed plate in which is slidably mounted a work-holding plate 2 on which the work is clamped by means of a suitable work clamp 3, and 4 indicates a head or overhanging arm which carries the upper-thread mechanism herein shown as a reciprocating needle bar 5 carrying the usual eye-pointed needle 6.

The upper thread is shown at 120 and it passes through a tension device 160, then through an eye 176 of a take-up arm 175, and thence through guides 150 to the needle. The take-up arm 175 is similar to that shown in my above-mentioned application and is carried by an eccentric strap 177 which encircles an eccentric 178 fast on the shaft 14 from which the needle-bar 5 is reciprocated. This eccentric strap is connected by a link 277 to a fixed pivot 180, and, therefore, as the eccentric revolves, the take-up arm 175 will have an up-and-down movement.

The under-thread mechanism is in the form of a stationary shuttle case 110 which carries a bobbin and a rotary hook 111 adapted to take each loop of needle thread as it is inserted through the work and carry said loop about the shuttle thereby causing the needle thread and the shuttle thread to be interlocked. The shuttle case is provided with a guide-eye 112 through which the under-thread 113 is delivered to the work w and is also provided with a tension element 207 for tensioning the under thread. The hook is rotated by a shaft 7 which is driven from a main driving shaft 8. The shaft 8 in turn is driven from a driving pulley 9 which is loosely mounted thereon and which is clutched thereto at the beginning of the stitching operation and is automatically unclutched therefrom at the completion of the stitching on a buttonhole by a clutch 96.

The work-supporting plate 2 is provided with a slot 104 in which is received the throat-plate 101 that is associated with the under-thread mechanism. This throat-plate is provided with an opening 102 through which the needle 6 operates and with a slit 103 which co-operates with the buttonhole cutter, not shown, to cut the slit in the buttonhole. The throat-plate is stationary and the work plate 2 has a forward and backward feeding movement to feed the work as the stitching is performed along one side of the buttonhole, and then back along the other side of the buttonhole. The slot 104 in the work plate 2 is of sufficient length to permit this feeding movement of the work plate. The top of the throat-plate 101 comes substantially flush with the top of the work plate 2, as shown in Figs. 10 and 10ᵃ.

The feeding movement of the work plate 2 is produced by means of a feed cam 10 which is actuated from the driving shaft 8, said feed cam being provided with a feed groove 11 by which an elbow-lever 12 is actuated, said lever being connected to the work plate 2 by means of a link 13, all as shown in said above-mentioned application.

Figure 3:
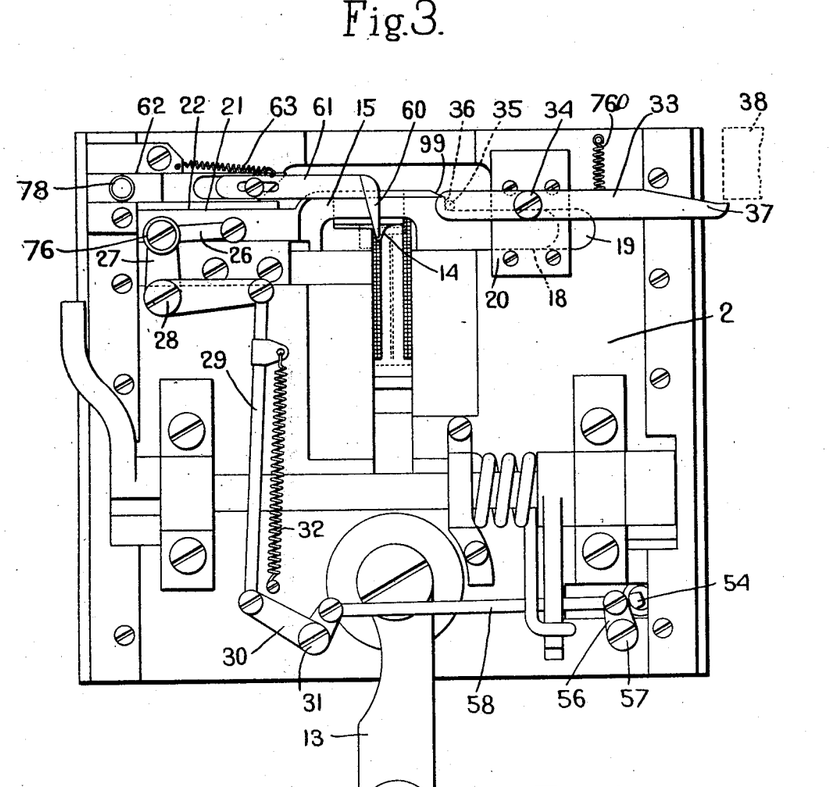
Fig. 3 is an enlarged underside view of the movable work-holding plate showing the under-thread-trimming mechanism.
Figure 4:
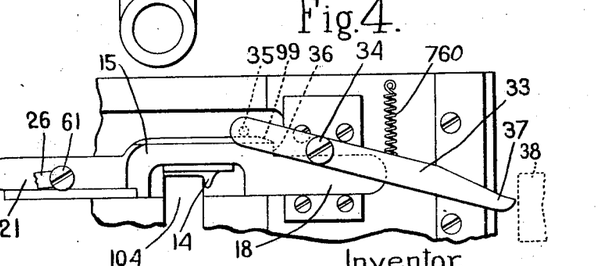
Fig. 4 is a detail view showing the position of the under-thread trimmer when the buttonhole in partly stitched.

The trimming device for the under thread comprises two shearing members, one of which is carried by the throat-plate 101, and the other of which is carried by the work-supporting plate 2. The throat-plate 101 is formed with a vertical portion 105 in which is provided a slot 16, the edge 24 of which slot constitutes one of the shearing elements of the under-thread-trimming device. The opposite edge 26 of the slot 16 is rounded slightly and forms one element of the thread-holding device. The other element of the thread-trimming device is in the form of a knife element 14 that is carried by a knife-holding slide 15, it having a shearing edge 23 which co-operates with the shearing edge 24 of the slot 16 and also having a rounded under clamping edge 25 which co-operates with the rounded edge 26 of the slot to clamp the thread, as presently described. The slide 15 is in turn supported by the work-holding plate 2 on the under side thereof and is mounted to have a sliding movement transversely of the line of feed. Said slide is provided at one end with a guiding extension 18 which is received in a guiding slot 19 formed on the under side of the work-holding plate 2 and is retained in said slot by a retaining plate 20. The other end of the slide 15 is also provided with an extension 21 slidably mounted in a slot 22 formed on the under side of the work-holding plate 2. The knife element 14 extends laterally from the slide 15, and said slide has sufficient movement to carry the knife from one side to the other of the buttonhole slit, Figs. 3 and 4 showing the knife in its two different positions. The knife is so positioned on the plate 2 that when the machine has been brought to rest and the plate has completed its feeding movement said knife will be in such a position that a movement of the slide 15 will carry the shearing edge of the knife into slot 16 in the throat-plate, as shown in Fig. 9. When the stitching on a buttonhole begins, the work plate 2 is moved forwardly, such movement carrying with it the knife 14 and withdrawing the knife from the open end of the slot 16, as shown by the dotted line in position Fig. 9.

Figures 9, 10:
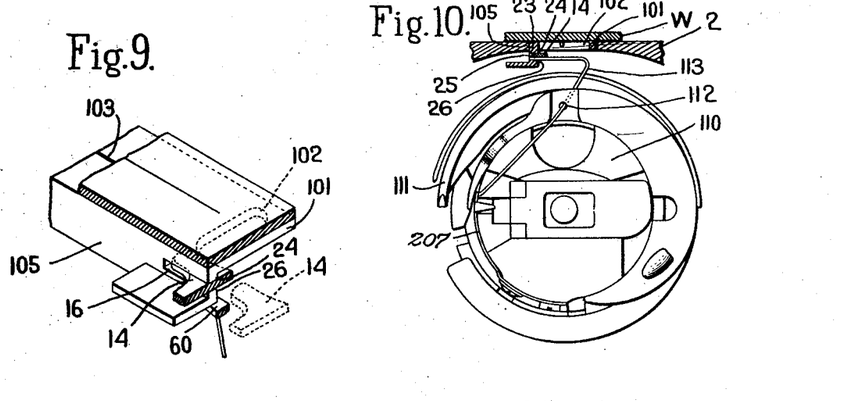
Figs. 9, 10, 10ª, 11, 12 and 13 are fragmentary views showing different positions of the under thread trimmer and under-thread pull-off device, Figs. 9, 11, 12 and 13 being perspective views, and Figs. 10 and 10ª being front views of the throat-plate.
Figure 10A:
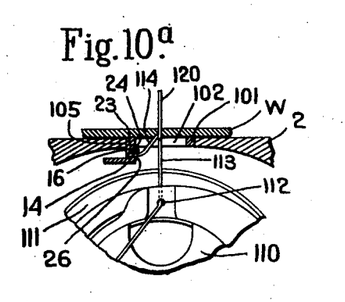
Figure 11:
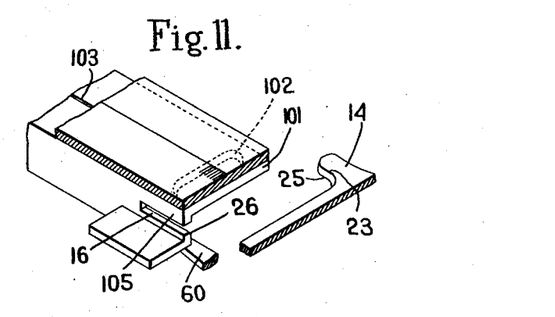

After the stitching on the first side of the buttonhole has been partially completed, the knife has been moved forwardly to a point beyond that at which the needle is operating, as shown in dotted lines Fig. 9, and when this position has been reached, said slide 15 is actuated to move the knife laterally into the position shown in Fig. 11. After the knife has been moved into this position, the stitching on the buttonhole continues until one side is finished, and then the work plate 2 is moved backwardly while the stitching is performed on the other side of the buttonhole. When the buttonhole is completed, the feeding movement of the plate 2 has brought the knife into a position opposite the slot 16, and the under thread is situated between said knife and said slot. The knife 14 is then moved from the position shown in Fig. 4 to that shown in Fig. 9, and during such movement, it engages the under thread 113 and cuts said thread between the shearing edges 23 and 24, and the cut end is clamped between the rounding edges 25, 26. This is the position of the trimming element when the machine is brought to rest and the end of the thread will remain firmly held until after the machine starts stitching on the next buttonhole. As the stitching proceeds and the knife moves forwardly out of the slot 16, the end of the thread which is clamped between the surfaces 25, 26 will be released, but this will not occur until after the first stitches on the next buttonhole have been formed.

It will be noted that during the cutting and clamping of the thread the cutting and clamping members have a relative movement in one direction and that during the releasing of the thread after the stitching operation on the next buttonhole has begun, the releasing movement is in some other direction than a reversal of the direction during cutting and clamping. In the construction illustrated the releasing movement is at right angles to the cutting and clamping movement, and this construction has the advantage that the release of the thread will be effected after two or three stitches have been formed and before the stitching has progressed sufficiently to permit the knife to move into the position shown in Figs. 4 and 11 without interfering with the needle. If the thread was held clamped while a considerable portion of the buttonhole was being stitched, the pull on the clamped end would tend to distort the stitching of the buttonhole.

The means by which the knife 14 is given its operative movements will be presently described.

Associated with the thread trimmer is a pull-off for pulling off the length of under thread 113 just prior to the cutting thereof, this pull-off being so arranged that the amount of thread which is thus pulled off will be just sufficient to form the first stitch at the beginning of a buttonhole. This pull-off is in the form of a pull-off finger 60 which is carried by a slide 61 that is guided in suitable guiding grooves 62 formed in the under side of the work-plate 2. Said pull-off is acted upon by a pulling spring 63 which normally tends to hold it in the position shown in Fig. 3 at one side of the buttonhole slit. Since the pulling-off finger 60 is carried by the work-plate 2, said finger will be moved forwardly and backwardly with the work-plate during the feeding movement, and when the buttonhole has been completed, said finger will be in the position shown in Fig. 3.

Figure 12:
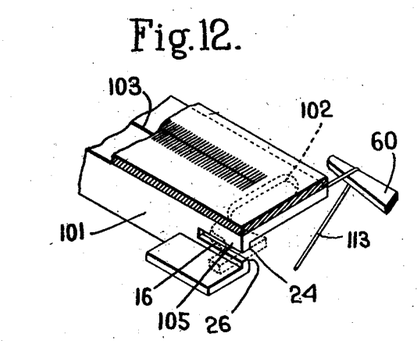
Figure 13:
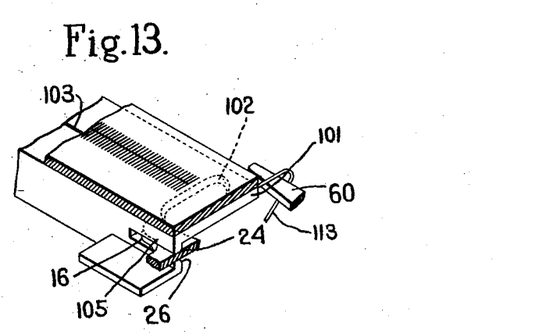
Figure 18:
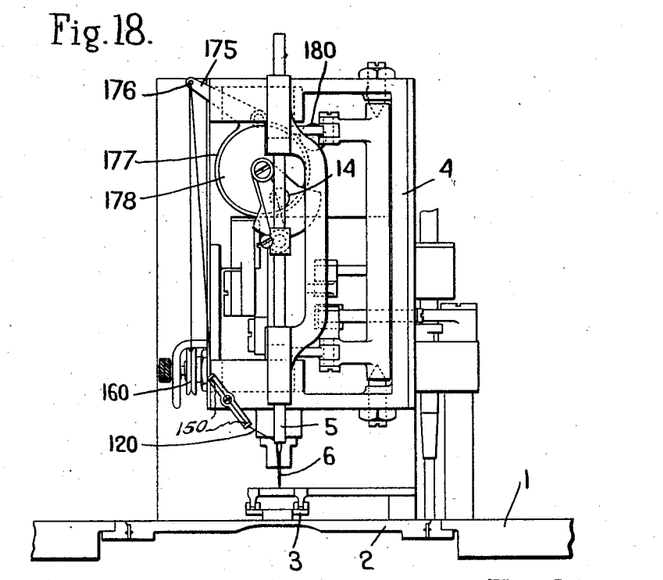
Fig. 18 is a front view of the upper thread mechanism.

When the stitching on the buttonhole is completed and the knife 14 begins its movement from the position shown in Fig. 4 to that shown in Fig. 3, the pulling-off finger is simultaneously given a movement from the position shown in Fig. 9 to that shown in Fig. 12. This simultaneous movement of the knife 14 and finger 16 in opposite direction acts on the under thread 113 to pull off from the bobbin an added length. The movement of the finger 60 is such that it reaches its extreme position shown in Fig. 12 just as the cutting edge 23 of the knife 14 is about to enter the slot 16, and as the knife enters said slot the finger 60 is moved backwardly slightly to give up some slack in the thread so that during the actual cutting and clamping of the thread the latter will not be under tension. After the thread has been cut, the finger 60 returns to its normal position.

The amount of thread which is thus pulled off by the finger 60 is just sufficient to form the first stitch at the beginning of the stitching operation on the next buttonhole. In forming the first stitch on the next buttonhole, the needle is actuated to penetrate the work and the hook 111 takes a loop of needle thread and casts it about the shuttle case. The take-up arm 175 then operates to take up the slack in the needle thread so as to set the stitch. This draws the loop of needle thread close to the work, as shown in Fig. 10$^a$, and in doing so, draws up the shuttle thread 113 to the work. The amount of under thread which is pulled off by the finger 60 is just sufficient to provide for the under thread being drawn up to the work as the first stitch is formed, as shown in Fig. 10ª.

The throat-plate is relatively thin, the thickness thereof being considerably exaggerated in Figs. 9 to 13, so that in the actual machine the knife 14 operates close to the under side of the work, and the end 114 of the under thread 113 extending from the work to the knife as the first stitch is formed is so short as to be entirely inconspicuous when the buttonhole is completed.

The movement of the slide 15 toward the right, Fig. 3, is a spring-impelled movement, and its operative cutting movement toward the left is a positive cam-actuated movement. Said slide is shown as connected by a link 26 to an elbow-lever 27 pivoted at 28, said elbow-lever 27 being connected by a link 29 to another elbow-lever 30 pivoted at 31, said lever 31 having a link 58 pivotally connected thereto, which link is connected to an arm 56 pivoted at 57 and by which the upper-thread-cutting mechanism is operated, as will be presently described.

32 indicates a pulling spring connected at one end to the plate 2 and at the other end to the link 29, said spring tending normally to turn the elbow-lever 27 in a direction to move the slide 15 to the right, Fig. 3. Said slide is normally held in the position shown in Figs. 9 and 3 by means of a latch lever 33 pivoted to the underside of the plate 2 at 34 and having at one end a pin 35 adapted to engage a shoulder 36 formed on the slide 15. The end 37 of this latch lever 33 projects beyond the edge of the plate 2 and is situated to be engaged by a block 38 secured to the underside of the bed 1 as the plate 2 moves forwardly. At the time that the stitching on the buttonhole commences the parts are in the position shown in Figs. 1 and 3 and the end 37 of the latch lever will be slightly in the rear of the block 38. As the stitching on the buttonhole proceeds and the plate 2 moves forwardly, the end 37 of the latch lever engages the block 38 and is swung thereby so as to carry the pin 35 out of engagement with the shoulder 36, as shown in Fig. 4, and when this occurs, the spring 32 operates automatically to shift the knife-carrying slide 15 to the right, Fig. 3, into the position shown in Figs. 4 and 11. The parts are so constructed that this lateral shifting of the knife occurs after the work plate 2 has been fed forwardly a sufficient amount to carry the knife beyond the stitching point so that during such lateral movement the knife will not engage the under thread.

The slide 15 is provided with a cam face 99 directly above the shoulder 36. The purpose of this cam face is to give the latch lever 33 an added movement after it is disengaged from said shoulder 36, so that a clearance will be provided between the end 37 thereof and the block 38. After the pin 35 has been carried out of engagement with the shoulder 36, the spring-impelled movement of the slide 15 to the right, Fig. 3, will cause the pin to ride up the inclined cam face 99, as shown in Fig. 4, thus giving an added swinging movement to the latch lever 33. This carries the end 37 thereof sufficiently beyond the side face of the block 38 so that there is no danger that the lever will strike the block during the return movement of the work plate 2.

Figure 5:
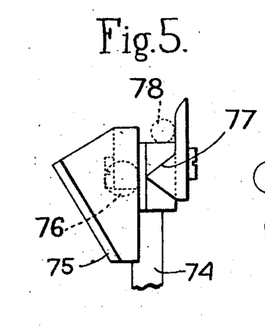
Fig. 5 is a view of the cam mechanism for actuating the thread-trimming devices.

As stated above, the cutting movement of the knife 14 is a positive cam-actuated one, and this movement is secured by means of a reciprocating slide 74 which is provided with a cam 75 adapted to engage a roll 76 carried by the elbow-lever 27. This same slide 74 is also the means by which the pulling-off finger 60 is given its pulling-off movement, said slide being provided with a cam 77 for this purpose which engages a roll 78 on the slide 61. During the stitching operation the slide 74 is in the position shown in Fig. 5 relative to the rolls 78, 76, and at the completion of the stitching operation, said slide is moved forwardly, and during this movement the cams 77 and 75 act simultaneously on the rolls 78 and 76, thus moving the slides 61 and 15 simultaneously but in opposite directions. This carries the knife 14 from the position shown in Fig. 4 to that shown in Fig. 3 and moves the slide 61 in a direction to carry the pulling-off finger from the position shown in Fig. 9 to that shown in Fig. 12. The knife 14 is situated between the finger 60 and the throat-plate 2, and hence during this simultaneous movement of said knife and pulling-off finger in opposite directions, the portion of the under thread which extends from the work will be drawn toward the slot 16 by the knife and the portion of the thread beneath the knife will be carried in the opposite direction by the finger 60, this combined action of the knife and pulling-off finger drawing off the required length of under thread. The cam 77 is so designed that the roll 78 will pass over the peak of the cam just before the cutting edge of the knife 14 enters the slot 16. The passing of the roll 78 over the peak of said cam 77 will allow a backward movement of the finger 60 which will give up some slack to the thread so that as the cutting edge of the knife passes into the slot 16 to sever the under thread, the tension on the latter is released so that the actual cutting and clamping of the thread is accomplished while the latter is not under tension. If the thread were under tension at the time it was cut there would be danger that the tension on the thread would pull the cut end out between the clamping surfaces, but by providing for this slight retrograde movement of the pulling-off finger while the thread is being cut the tension on the thread is relieved so that there is no tendency for the cut end to be pulled out from between said clamping surfaces. After the slide 74 has completed its forward movement and the thread has been cut and clamped, then it is returned to its normal position.

The slide 74 is actuated by a driving mechanism separate from the driving pulley 9 which actuates the driving shaft 8 by which the stitch-forming mechanism is actuated, and means are provided whereby the driving mechanism for the slide 74 is normally inoperative during the stitching on the buttonhole, but is thrown into operation just as the stitch-forming mechanism is completing the last stitch.

The shaft 8 has loosely mounted thereon a sleeve 64 which carries a loose driving pulley 65. This pulley is adapted to be clutched to the sleeve 64 by means of a clutch 66 that is thrown into engagement by the clutch spring 67. The clutch is connected to a clutch-controlling lever 68 pivoted at 69, and during the stitching operation this lever is held in the dotted line position Fig. 2 by means of a latch lever 70 which engages a notch 97 in the lever 68 and which forms part of the stopping mechanism for the stitch-forming mechanism, all as described in my above-mentioned application. When the clutch-controlling lever 68 is in the dotted line position, the clutch 66 is disengaged so that the pulley 65 is simply running loosely on the sleeve 64.

Figure 2:
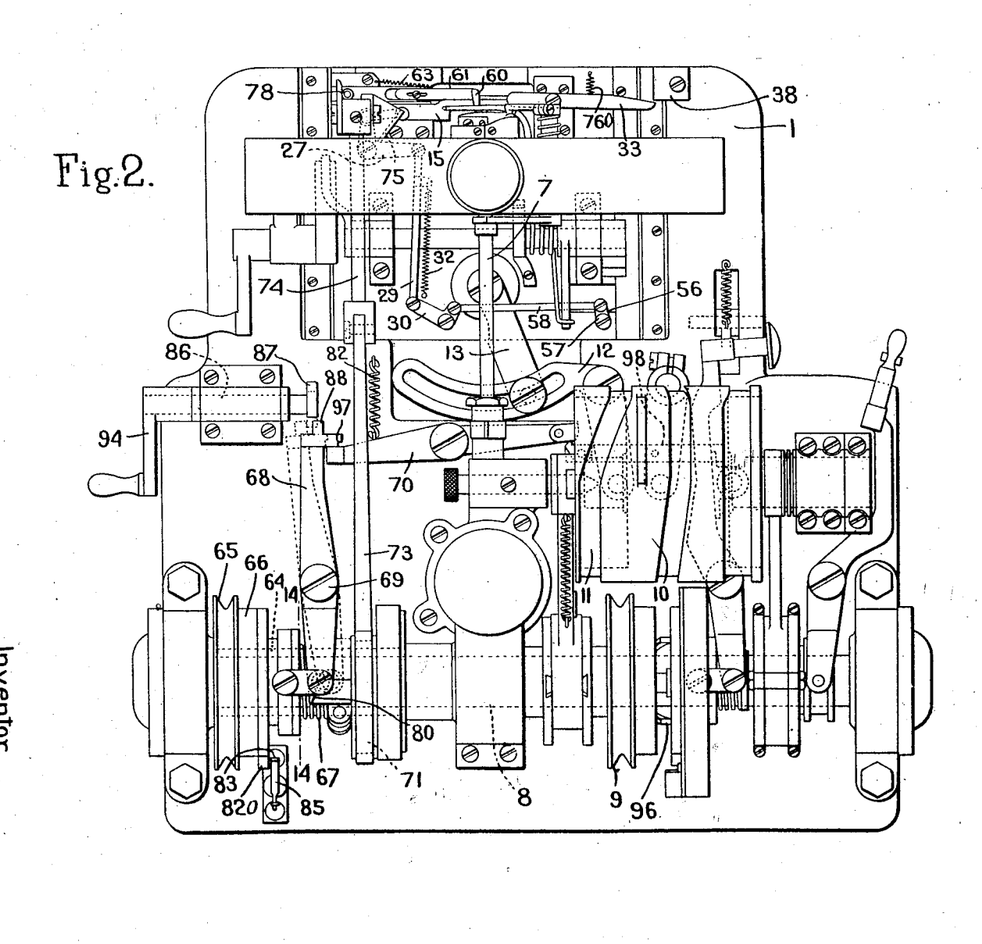
Fig. 2 is an underside view of the work support showing the mechanism for controlling the stitch-forming mechanism and also illustrating the means for operating the thread-trimming device.

At the completion of the stitching operation on the buttonhole, the stitch-forming mechanism is brought to rest by a stop mechanism, all as described in my said application, and the operation of the stop mechanism shifts a slide 98 to the left, Fig. 2, so that the end thereof engages the cam-faced end of the latch lever 70 and swings the latter into the full line position, Fig. 2, thereby disengaging it from the notch 97 and releasing the clutch-controlling lever 68. This allows the spring 67 to throw the clutch into engagement thereby clutching the sleeve 64 to the pulley 65. This sleeve 64 has an eccentric 71 thereon, the eccentric strap 72 of which has an arm 73 which is connected to the cam-actuating slide 74.

As soon as the sleeve 64 is clutched to the pulley 65, the eccentric 71 will make one revolution, thus moving the member 74 forwardly, such forward movement actuating first the pull-off finger 60 to pull off the length of under thread and then giving the cutter 14 its positive cutting movement. The complete rotation of the eccentric 71 will move the member 74 forwardly and then return it to its normal position. When the knife slide has been moved into the position shown in Fig. 9, the latch lever 33 is automatically brought into its operative position, thus placing the pin 35 behind the shoulder 36 and locking the knife slide in the position shown in Figs. 3 and 9. This automatic operation of the latch lever 33 is accomplished through the action of a pulling spring 760. The clutch 66 is constructed so that it will be disconnected automatically when the sleeve 64 has made one revolution, and any suitable means for thus disengaging the clutch may be employed without departing from my invention.

In the construction shown, the sleeve 64 is provided with a stop cam 80 which is adapted to engage a projection 81 carried by one arm of the forked clutch-controlling lever 68, said cam operating to move the lever into the dotted line position, Fig. 2, thereby to disengage the clutch. As soon as the clutch lever is thus swung into its dotted line position, the spring 82 acting on the latch lever 70 will throw the latter into its dotted line position, Fig. 2, thereby to lock the clutch disengaged. For bringing the clutch to rest with the sleeve 64 at predetermined point, I have provided said clutch 66 with a stop projection 820 which is adapted to engage a yielding stop dog 83 that is mounted in a housing 84 secured to and depending from the bed plate. This housing and stop dog are so situated that when the clutch is engaged, the projection 820 is out of line therewith, but when the clutch is disengaged and moved to the right, Fig. 2, the stop projection 82 comes into position to strike the stop dog 83. The parts are so positioned relative to each other that the stop projection 820 will come into engagement with the yielding stop dog 83 immediately after the clutch has been disengaged by the cam 80. 85 indicates a spring-pressed latch which is constructed to snap behind the projection 820 when the parts have been brought to rest in order to prevent any rebound. When the clutch is thrown into engagement it is moved axially of the sleeve thereby to carry the stop projection 820 out of engagement with the stop dog 83.

As stated above, my invention also includes means for cutting the upper or needle thread simultaneously with the cutting of the under thread.

The trimmer for the upper thread is situated above the work-holding plate 2 and is carried by the work clamp 3.

The work clamp 3 carries at its forward end two superposed disks 39, 40 which are retained in position by the stud 41, the disk 39 being stationary and the disk 40 being capable of rotation. These disks are provided with notches 42, 43 which are normally in alignment and are situated at the rear side of the disks and in such position that at the end of the stitching operation the needle thread will occupy said alined notches. The turning of the disk 40 relative to the disk 39 will carry the notches out of alinement thereby cutting the needle thread and the cut end of said thread will be held between the disks.

The movable cutting disk 40 is provided with an arm 44 which is connected by a link 45 to a lever 46 pivoted at 47 on an arm 48 which carries the work clamp 3. The end of this lever 46 is provided with a slot 49 in which is received a pin 50 carried by an arm 51 of an elbow-lever pivoted at 52 to the supporting arm 48. The other arm 53 of this elbow-lever extends to the rear and is provided with a pin 54 which depends through a slot 55 formed in the plate 2. The lower end of this pin 55 engages the arm 56 pivoted at 57. The elbow-lever 53 is acted upon by a pulling spring 59 which tends to swing the rear end of said lever to the left, Fig. 6, thus carrying the lever 46 and link 45 into the dotted line position. When in this position the notches 42 and 43 in the cutting disks 39 and 40 are in alinement.

Figure 6:
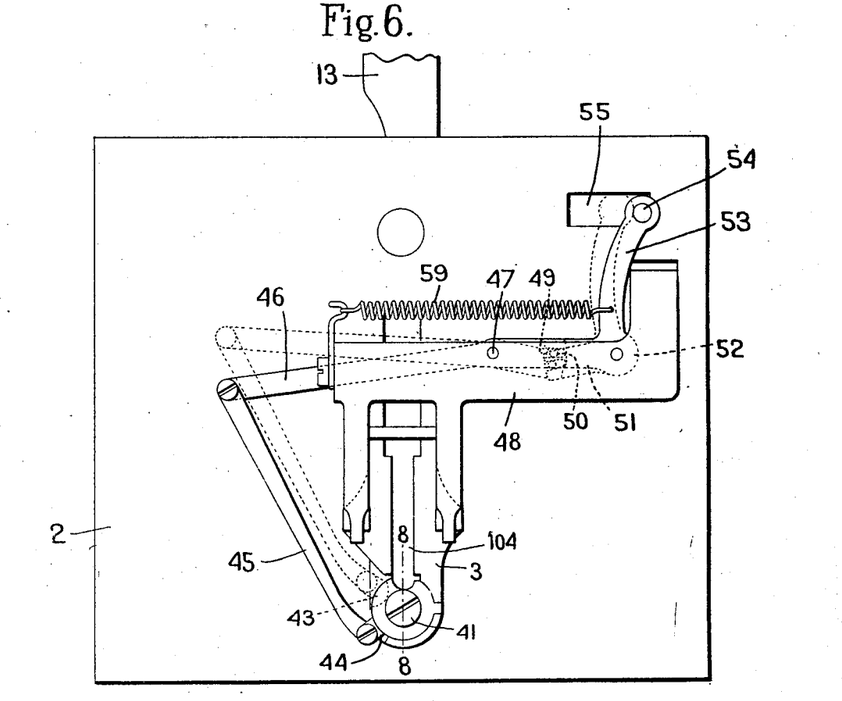
Fig. 6 is a plan view of the work-holding plate showing the upper thread trimmer.
Figure 7:
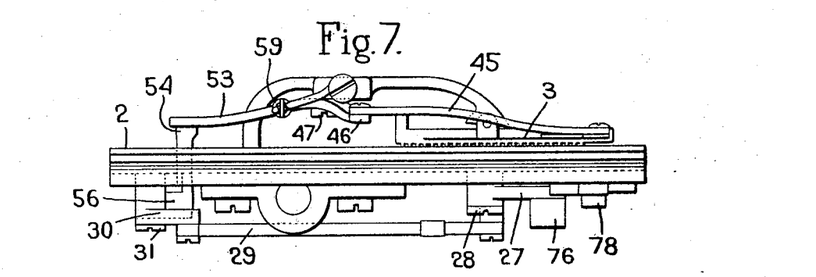
Fig. 7 is an end view of the work-holding plate showing the upper and under thread trimmers.
Figures 8, 17:
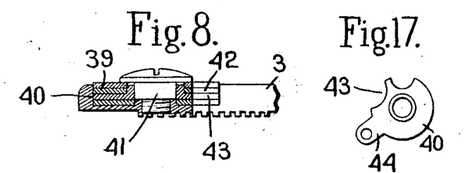
Fig. 8 is an enlarged sectional view of the upper thread trimmer, said view being taken on the line 8—8, Fig. 6.
Fig. 17 is a view of the thread-cutting disk for the needle thread.

At the end of the stitching on the buttonhole when the knife-holding slide 15 is moved to the left, Fig. 3, thereby to cut the under thread, such movement operates through the elbow-lever 27, link 29, elbow-lever 30, link 58 and arm 56 to swing the lever 53 from the dotted to the full line position, Fig. 6, and this movement of the lever 53 carries the lever 46 and link 45 into their full line positions, thus turning the cutting disk 40 to cause it to cut the upper thread and hold the cut end. When the sewing machine comes to rest, therefore, both the upper and under thread will be cut and the cut ends will be held. When the stitching on the next buttonhole is started and the plate 2 moves forwardly for stitching down one side of the buttonhole, the latch lever 37 will be actuated by the block 38 thereby to release the knife-holding slide 15 which will then be shifted into the position shown in Fig. 4 by the spring 32, as above described. This movement will withdraw the arm 56 from the pin 54 thereby allowing the spring 59 to operate to carry the mechanism of the upper thread-cutting device into the dotted line position, in which position the notches 43 and 42 are in alinement and in position to receive the needle thread at the end of the stitching operation.

Figures 19, 20:
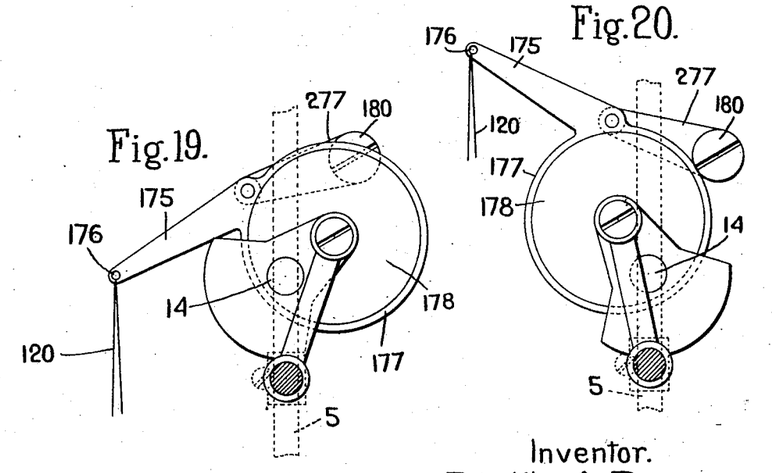
Figs 19 and 20 show the operation of the take-up in pulling off a length of upper thread.

In order to permit the first stitch on the buttonhole to be formed when the machine is started, it is necessary that there should be a sufficient length of upper thread pulled off through the tension device to provide for forming the loop in the upper thread which is cast about the shuttle. The end of the upper thread is held in the upper thread cutter while the first stitches are being formed and until the knife slide is released by the action of the latch 33. I have herein provided a construction wherein the take-up for the upper thread operates to pull off the desired length when the machine is first started and before the needle 6 makes its first penetrating thrust. When the machine is brought to rest the take-up arm 175 is in a position slightly above that shown in Fig. 19, and when the sewing machine starts, the take-up arm is first moved upwardly into the position shown in Fig. 20 before the needle makes its penetrating thrust, and since the end of the thread is held by the thread cutter and holder, such upward movement will draw off a length of upper thread from the source of supply through the tension 160. The length thus drawn off is sufficient to provide for the forming of the first stitch, and by this means a separate pull-off for the upper thread is unnecessary.

I have shown herein manually-controlled means by which the clutch 66 may be held disengaged even when the latch lever 70 is actuated. This is in the form of a rock-shaft 86 journaled underneath the bed plate 1 and carrying at one end an arm 87 which is adapted to be swung into engagement with a projection 88 carried by the end of the lever 68, as shown in dotted lines Fig. 2. The rock shaft 86 is provided with a crank handle 94 by which it may be actuated.

When the rock-shaft is turned so as to bring the arm 87 into engagement with the projection 88, then the clutch 66 will be held disengaged notwithstanding the operation of the latch lever 70 due to the stopping of the machine. In this sewing machine the device for cutting the buttonhole is actuated by an eccentric carried by the sleeve 64, all as shown in my above-mentioned copending application Se. No. 280,704, and hence when the clutch 66 is held disengaged by the operation of the rock-shaft 86, neither the buttonhole cutter or the thread trimming devices will be actuated.

In case the thread breaks during the stitching of the buttonhole, it is customary to continue the sewing operation without the thread until the machine has gone through its regular cycle and has returned to its initial position of rest and then to re-thread the machine and sew the buttonhole over again. In case the thread does thus become broken, the operator will actuate the rock-shaft 86 so as to lock the clutch 66 disengaged and then will complete the cycle of operations on the buttonhole. At the completion of the cycle the buttonhole cutter will be prevented from operating to cut the buttonhole and the thread trimmers will also be prevented from operating. The machine may then be threaded up again and the stitching on the buttonhole performed over. By this means the buttonhole will not be cut until after it is actually stitched.

It will be noted that the sewing machine herein illustrated is of that type in which the entire mass of under thread is passed through the loop of needle thread during the formation of each stitch, thus forming what is known as the lock stitch. I believe that I am the first to provide a lock stitch sewing machine with means to draw off a length of under thread sufficient to form the first stitch and then to cut said thread close to the work and hold the cut end until after the first stitch is formed when the machine is started again. It will be noted that in the device of the application the thread-cutting means is a power-driven means, that is, it is actuated by a power-driven element exemplified in the driving pulley 65. By the term "power-driven" as used herein and in the claims I intend to cover an element such as a driving pulley which is driven by an outside source of power and which furnishes the power to operate the associated parts, as distinguished from a manually-controlled device. The term "power-driven" is not intended to include a manual operation.

While I have illustrated a selected embodiment of my invention, I do not wish to be limited to the constructional features shown.

I claim:

1. In a sewing machine, the combination with stitch-forming mechanism, of work-holding means, driving and stopping mechanism by which the stitch-forming mechanism is actuated and a relative movement between said stitch-forming mechanism and work-holding means is produced, and by which the stitch-forming mechanism is brought to rest and said relative movement terminated at the end of the seam, a thread-cutting device for cutting the thread, actuating means therefor, including a driving pulley, and means controlled by the stopping and starting mechanism to render said actuating means operative when the stitch-forming mechanism is brought to rest and said relative movement terminated.

2. In a sewing machine, the combination with stitch-forming mechanism, of work-holding means, driving and stopping mechanism by which the stitch-forming mechanism is actuated and a relative movement between said stitch-forming mechanism and work-holding means is produced, and by which the stitch-forming mechanism is brought to rest and said relative movement terminated at the end of a seam, a thread-cutting device for cutting the thread, actuating means therefor independent from the driving and stopping mechanism, and means controlled by the driving and stopping mechanism to render said actuating means operative when the stitch-forming mechanism is brought to rest and said relative movement terminated.

3. In a sewing machine, the combination with stitch-forming mechanism, of work-holding means, two continuously-rotating power-actuated driving devices, means operated by one driving device to actuate the stitch-forming mechanism and produce a relative movement between the latter and the work-holding means and to bring the stitch-forming mechanism to rest and terminate said relative movement at the end of the seam, a thread-cutting device, and other means separate from said first-named means to actuate the thread-cutting device from the other driving device.

4. In a sewing machine, the combination with stitch-forming mechanism, of work-holding means, two power-actuated driving devices, means operated by one driving device to actuate the stitch-forming mechanism and produce a relative movement between the latter and the work-holding means and then to bring the stitch-forming mechanism to rest and terminate said relative movement, a thread-trimming device, means operated by the other driving device to actuate the thread-trimming device, and means automatically to render said other driving device operative when the stitch-forming mechanism comes to rest.

5. In a sewing machine, the combination with stitch-forming mechanism, of work-holding means, two driving pulleys, operative connections between one driving pulley and the stitch-forming mechanism and work-holding means by which the stitch-forming mechanism is operated and a relative movement is produced between the latter and the work-holding means, and by which the stitch-forming mechanism is brought to rest and said relative movement terminated at the end of the seam, a thread-cutting device, and operative connections between the other driving pulley and the thread-cutting device which are separate from the first-named operative connections.

6. In a sewing machine, the combination with stitch-forming machanism, of work-holding means, two driving pulleys, operative connections between one driving pulley and the stitch-forming mechanism and work-holding means by which the stitch-forming mechanism is operated and a relative movement is produced between the latter and the work-holding means, and by which the stitch-forming mechanism is brought to rest and said relative movement terminated at the end of the seam, a thread-cutting device, operative connections between the other driving pulley and the thread-cutting device which are separate from the first-named operative connections, and means to render said second-named operative connections operative when the stitch-forming mechanism comes to rest.

7. In a sewing machine, the combination with stitch-forming mechanism, of work-holding means, two driving pulleys, means, including a clutch, for operatively connecting one driving pulley with the stitch-forming mechanism and work-holding means, whereby said stitch-forming mechanism is actuated and a relative movement produced between the latter and the work-holding means, a thread-cutting device, and means, including a clutch, for connecting the other pulley to the thread-cutting device, said last-named means being separate from the first-named means.

8. In a sewing machine, the combination with stitch-forming mechanism, of work-holding means, two driving pulleys, a clutch for operatively connecting one driving pulley to the stitch-forming mechanism and work-holding means, thereby to actuate the stitch-forming mechanism and produce a relative movement between the latter and the work-holding means, means to disconnect said clutch when the stitch-forming mechanism has performed a predetermined sewing operation, a thread-cutting device, means, including a second clutch, for operatively connecting the other pulley to the thread-cutting device, said means being separate from the connections actuated by the first-named clutch, and means to cause said second clutch to become operative when the first-named clutch is disengaged.

9. In a sewing machine, the combination with stitch-forming mechanism constructed to concatenate both an upper and an under thread, of work-holding means, driving and stopping mechanism by which the stitch-forming mechanism is actuated, and a relative movement between the latter and the work-holding means is produced, and by which the stitch-forming mechanism is brought to rest and said relative movement terminated at the end of the seam, thread-trimming devices for cutting both the upper and the under thread, actuating means therefor which is separate from the means for producing said relative movement, and means controlled by the driving and stopping mechanism to render said actuating means operative when the stitch-forming mechanism is brought to rest.

10. In a sewing machine, the combination with stitch-forming mechanism comprising means to concatenate an upper and an under thread, of work-holding means, two separate power-actuated driving devices, means operated by one driving device to actuate the stitch-forming mechanism and to produce a relative movement between the latter and the work-holding means and then to bring the stitch-forming mechanism to rest and terminate said relative movement, separate thread-cutting devices for cutting the upper and under thread, and means operated by the other driving device to actuate both thread-cutting devices when the stitch-forming mechanism has come to rest, said means being separate from the means operated by the first-named power-driven device.

11. In a sewing machine, the combination with stitch-forming mechanism comprising means to concatenate an upper and an under thread, of work-holding means, two driving pulleys, means actuated by one pulley to operate the stitch-forming mechanism and produce a relative movement between the latter and the work-holding means and then to bring the stitch-forming mechanism to rest and terminate said relative movement, thread-trimming devices for cutting both the upper and the under thread, actuating means therefor independent from the work-holding means, and means for operatively connecting said second driving pulley to said actuating means when the stitch-forming mechanism comes to rest.

12. In a buttonhole sewing machine, the combination with stitch-forming mechanism, of a work-supporting plate, means to give the plate a feeding movement, a thread-cutting knife slidably sustained on the under side of said plate for movement transverse to the feed and from one side to the other of the line of stitching, automatic means operating in timed relation with the stitch-forming mechanism to move the knife into inoperative position after the buttonhole is partially completed, and power-driven means for positively moving the knife into position to cut the under thread at the end of the stitching operation and after the work-supporting plate has come to rest.

13. In a sewing machine, the combination with stitch-forming mechanism, of a throat plate associated therewith, a work-holding plate supported separately from the throat plate, said work-holding plate and throat plate being movable relative to each other, two co-operating cutting elements for cutting the thread, one of said elements being carried by the throat plate and one by the work-holding plate and both of said elements being situated beneath the work-holding plate, and power-driven mechanism to give said elements a relative cutting movement.

14. In a sewing machine, the combination with a work-holding plate, of stitch-forming mechanism, a throat plate supported separately from the work-holding plate, said plates being movable relative to each other and two co-operating cutting and clamping members for cutting the thread and holding the cut end, one of said members being carried by the throat plate and one by the work-holding plate.

15. In a sewing machine, the combination with stitch-forming mechanism, of a throat-plate associated therewith and having a shearing edge, a work-holding plate movable relative to the throat plate, a knife member movably carried by the work holding plate and co-operating with the shearing edge of the throat-plate to cut the thread at the end of the stitching operation, and power-driven means to actuate said knife.

16. In a sewing machine, the combination with stitch-forming mechanism, of a throat-plate associated therewith and having a shearing edge, a work-holding plate movable relative to the throat plate, a cutting and clamping member movably carried by the work-holding plate and co-operating with the shearing edge of the throat-plate to cut and clamp the thread at the end of the stitching operation, and power-driven means to actuate said member.

17. In a sewing machine, the combination with stitch-forming mechanism, of a throat-plate associated therewith, a work-holding plate movable relative to the throat plate, two thread-cutting members, one of which is stationarily carried by the throat-plate and the other of which is movably carried by the work-holding plate, and power-driven means to actuate the movable member at the end of the stitching operation to cut the thread.

18. In a sewing machine, the combination with stitch-forming mechanism, of a throat-plate associated therewith, a work-holding plate movable relative to the throat plate, two thread-cutting and clamping members, one of which is stationarily carried by the throat-plate and the other of which is movably carried by the work-holding plate, and power-driven means to actuate the movable member at the end of the stitching operation to cut and clamp the thread.

19. In a sewing machine, the combination with a work-holding plate, of stitch-forming mechanism, a throat plate supported separately from the work-holding plate, the latter being movable and the throat plate having a shearing edge, a knife member carried by the work-holding plate and co-operating with the shearing edge to cut the thread at the end of the stitching operation, and means to actuate said knife.

20. In a sewing machine, the combination with a work-holding plate, of stitch-forming mechanism, a throat plate having a shearing edge and a clamping edge, said throat plate being supported independently of the work-holding plate, a knife member carried by the work-holding plate and co-operating with both the shearing edge and clamping edge to cut and clamp the thread at the end of the stitching operation, and means to actuate said knife.

21. In a buttonhole sewing machine, the combination with stitch-forming mechanism, of a throat-plate associated therewith and having a shearing edge, a work-holding plate, a thread-cutting knife carried by said plate, means to give said work-holding plate a feeding movement first in one direction and then in the other, the movement in the first direction carrying the knife beyond the shearing edge, and the movement in the other direction bringing the knife into operative position relative to the shearing edge, and means operative at the end of the stitching operation to move the knife into cutting relation with said shearing edge thereby to cut the under thread.

22. In a buttonhole sewing machine, the combination with stitch-forming mechanism, of a throat-plate associated therewith and having a shearing edge and a clamping edge, a work-holding plate, a thread-cutting knife carried by said plate, means to give said work-holding plate a feeding movement first in one direction and then in the other, the movement in the first direction carrying the knife beyond the shearing edge and the movement in the other direction bringing the knife into operative position relative to the shearing edge, and means operative at the end of the stitching operation to move the knife into operative relation with the shearing edge thereby to cut the thread and clamp the latter.

23. In a buttonhole sewing machine, the combination with stitch-forming mechanism, of a work-holding plate, means to give the work-holding plate a feeding movement first in one direction and then in the other, a throat-plate having a shearing edge extending in the direction of feed, a knife carried by the work-holding plate and movable thereon in a direction transverse to the line of feed, the feeding movement which the work plate has at the beginning of the buttonhole carrying said knife beyond said shearing edge and the final feeding movement bringing said knife back again into operative position relative to said edge, means operative while the knife is beyond the shearing edge to move said knife laterally, and means operative at the completion of the buttonhole to move the knife in the reverse direction whereby it co-operates with the shearing edge to cut the under thread.

24. In a buttonhole sewing machine, the combination with stitch-forming mechanism, of a work-holding plate, means to give the work-holding plate a to-and-fro feeding movement, a throat-plate having a shearing edge situated at one side of the stitching point, a knife member carried by the work-holding plate and movable thereon transversely to the line of feed, feeding movement of said work-holding plate carrying the knife first beyond the shearing edge and then back into operative position relative thereto, means operative when the knife is beyond the shearing edge to shift it laterally to the opposite side of the line of stitching from that occupied by the shearing edge, and means operative at the completion of the buttonhole to move the knife back into its initial position whereby it co-operates with the shearing edge to cut the thread.

25. In a sewing machine, the combination with a work-holding plate, of stitch-forming mechanism, a throat-plate supported separately from the work-holding plate, a cutting and clamping member movably carried by the work-holding plate, means to actuate said member at the end of the stitching operation to cause it to co-operate with the throat-plate to cut and clamp the thread, and means operative after the next stitching operation has begun to actuate said member to release the thread.

26. In a sewing machine, the combination with a work-holding plate, of stitch-forming mechanism, a throat-plate supported independently from the work-holding plate, two thread-cutting and clamping members, one of which is stationarily carried by the throat-plate and the other of which is movably carried by the work-holding plate, means to actuate the movable member at the end of the stitching operation to cut and clamp the thread, and means operative after the next stitching operation has begun to give said movable member a thread-releasing movement.

27. In a sewing machine, the combination with a stitch-forming mechanism constructed to concatenate an upper and under thread, of a work-holding plate on which the work is supported, means beneath the work-holding plate to cut the under thread, means above the work-holding plate to cut the upper thread, devices beneath the work-holding plate for actuating the means for cutting the under thread, devices above the work-holding plate to actuate the cutting means for the upper thread, and a connection extending through the work-holding plate by which the last named devices are actuated by the first named devices.

28. In a sewing machine, the combination with stitch-forming mechanism including a reciprocating needle, of means operative at the end of a stitching operation to cut the thread and hold the cut end until after the next stitching operation has begun, and a take-up to set each stitch as it is formed, said take-up operating to draw a length of thread from the supply before the needle makes its penetrating thrust in the formation of the first stitch.

29. In a buttonhole sewing machine, the combination with stitch-forming mechanism, of a throat-plate provided with a shearing edge, a work-supporting plate, means to give the work-supporting plate a feeding movement, a thread-cutting knife slidably sustained on said work-supporting plate for movement toward and from the shearing edge, a spring tending to separate the knife from said edge, means operated by the feeding movement of the plate to render the spring operative when the buttonhole is partially completed, and means to give the knife a positive cutting movement at the completion of the buttonhole.

30. In a buttonhole sewing machine, the combination with stitch-forming mechanism, of a throat-plate having a shearing edge, a work-supporting plate, means to give the work-supporting plate a feeding movement, a thread-cutting knife slidably sustained on said work-supporting plate for movement toward and from the shearing edge, a spring tending to separate the knife from said edge, means normally restraining the spring from operation, means actuated by the feeding movement of the work-supporting plate to release the spring when the buttonhole is partially completed whereby the knife is carried into inoperative position, and means to move the knife positively into shearing relation with said shearing edge at the end of the stitching on a buttonhole.

31. In a buttonhole sewing machine, the combination with stitch-forming mechanism, of a work-supporting plate, means to give said plate a feeding movement, a thread-cutting knife slidably sustained on the under side of said plate, means operative when the buttonhole is partially stitched to move the knife into inoperative position, means for positively moving the knife into thread-cutting position at the completion of the stitching on the buttonhole, a pull-off finger for pulling off the under thread, and means to actuate said finger at the completion of the buttonhole and just prior to the cutting movement of the knife.

32. In a buttonhole sewing machine, the combination with stitch-forming mechanism, of a throat-plate provided with a shearing edge situated at one side of the line of stitching, a work-supporting plate, means to give the work-supporting plate a feeding movement, a thread-cutting knife slidably sustained on said work-supporting plate, a spring tending to move the knife away from the shearing edge, means to restrain the spring from operating, means actuated by the feeding movement of the work-supporting plate to release the spring when the buttonhole is partially completed, and cam-actuated means to move the knife into cutting relation with the shearing edge at the completion of the stitching operation.

33. In a buttonhole sewing machine, the combination with stitch-forming mechanism, of a throat-plate provided with a shearing edge situated at one side of the line of stitching, a work-supporting plate, means to give the work-supporting plate a feeding movement, a thread-cutting knife slidably sustained on said work-supporting plate, a spring tending to move the knife away from the shearing edge, means to restrain the spring from operating, means actuated by the feeding movement of the work-supporting plate to release the spring when the buttonhole is partially completed, cam-actuated means to move the knife into cutting relation with the shearing edge at the completion of the stitching operation, and means to draw off a length of thread just prior to the cutting movement of the knife.

34. In a buttonhole sewing machine, the combination with stitch-forming mechanism, of a throat-plate provided on its under side with a shearing edge, a work-supporting plate, means to give said work-supporting plate a feeding movement, a knife-carrying slide sustained on the under side of said work-supporting plate, a knife carried by said slide, a spring acting on said slide tending to move the knife into inoperative position, a latch acting on said slide and normally restraining the spring from movement, means to release the latch by the feeding movement of the work-supporting plate, and cam-actuated means operative at the completion of the stitching on the buttonhole to move said slide positively to carry the knife into cutting relation with the shearing edge.

35. In a buttonhole sewing machine, the combination with stitch-forming mechanism, of a work-supporting plate, means to give the plate a feeding movement, a thread-cutting knife slidably sustained on the under side of said plate, a pull-off finger for pulling off a length of thread, automatically-operative means to move the knife into inoperative position during the stitching on the buttonhole, and cam-actuated means operative at the completion of the stitching on the buttonhole to move the pull-off finger thereby to pull off a length of under thread and subsequently to give the knife a cutting movement to sever said thread.

36. In a buttonhole sewing machine, the combination with stitch-forming mechanism, of a driving pulley for operating said mechanism, a work-supporting plate, a thread-cutting knife carried by said plate, means operative during the stitching on a buttonhole to move said knife into inoperative position, a second driving pulley, and means operative at the completion of the stitching on a buttonhole to actuate said knife from said second driving pulley thereby to cause it to cut the thread.

37. In a buttonhole sewing machine, the combination with stitch-forming mechanism, of a driving pulley for operating said mechanism, a work-supporting plate, a thread-cutting knife carried by said plate, means operative during the stitching on a buttonhole to move said knife into inoperative position, a pulling-off finger for pulling off a length of thread, a second driving pulley, and means operative at the completion of the stitching operation on a buttonhole to actuate said pulling-off finger and knife from said second pulley thereby to draw off a length of thread and then sever said thread.

38. In a two-thread lock-stitch buttonhole sewing machine, the combination with means to interlock an upper and an under thread by passing the entire mass of under thread through loops of the upper thread, of two relatively movable elements co-operating to cut and clamp the under thread at the end of the stitching operation, means to move said elements relatively in one direction for cutting and clamping the thread and in another direction other than a reverse of the first-named direction to release the clamped end when the next stitching operation begins.

39. In a two-thread lock-stitch buttonhole sewing machine, the combination with means to interlock an upper and an under thread, of relative movable elements co-operating to cut and clamp the under thread at the end of the stitching on a button-hole, means to move said elements relatively in one direction for cutting and clamping the thread and in another direction at right angles to the first-named direction to release the thread.

40. In a sewing machine, the combination with stitch-forming mechanism, of two relatively movable parts to cut the thread and clamp the cut end at the end of a sewing operation, means to move said parts relatively in one direction for cutting and clamping the thread and in another direction at right angles to the first-named direction to release the thread when the next stitching operation begins.

41. In a two-thread lock-stitch buttonhole sewing machine, means to interlock an upper and an under thread, means operative at the completion of a buttonhole to pull off sufficient under thread to begin the sewing of the next buttonhole, a device separate from the pull off and operating at a different time period to cut said thread free from the sewed buttonhole, and means to clamp the cut end.

42. In a two-thread lock-stitch buttonhole sewing machine of the type in which the under thread is drawn from a bobbin carried in a stationary shuttle case which is provided with the usual tension for said under thread, the combination with means to interlock an upper and an under thread, means to cut the under thread at the completion of a buttonhole and clamp the cut end, means separate from the cutting means and operating prior to the clamping of the under thread to pull off a length sufficient to extend from the work to the clamping means whereby during the formation of the first stitch of the next succeeding buttonhole the under thread will be pulled to the work against the under thread tension.

43. In a sewing machine, the combination with means to concatenate an upper and an under thread, of a tension for the under thread, means to cut and clamp the under thread at the end of a stitching operation, and a pull-off device acting on the under thread prior to the cutting and clamping thereof to draw off a length through the tension, said pull-off device operating to relieve the strain on the under thread just prior to the clamping thereof.

44. In a sewing machine, the combination with means to concatenate an upper and an under thread, of means to cut the under thread at the end of the sewing operation and clamp the cut end, and means acting on the under thread to pull off a length thereof before said thread is cut, said means operating to relieve the strain on the thread at the moment of clamping.

45. In a sewing machine, the combination with stitch-forming mechanism, of means to cut and clamp the thread at the end of a stitching operation, and means to pull off a length of thread from the supply before the cutting and clamping thereof, said pull-off means operating to relieve the strain or tension on the thread at the moment of clamping.

46. In a sewing machine, the combination with stitch-forming mechanism, of means to cut the thread at the end of the sewing operation and to clamp the cut end, a movable pull-off, means to move said pull-off in one direction at the completion of the stitching operation and before the thread is cut and clamped to cause it to draw off a length from the supply and to reverse the direction of movement of said pull-off at the moment of clamping whereby the tension on the thread is relieved during the clamping operation.

47. In a buttonhole sewing machine, the combination with stitch-forming mechanism constructed to concatenate an upper and an under thread, of a throat-plate provided with an opening through which the stitch-forming mechanism operates, means operative at the completion of a buttonhole to cut and clamp the thread which extends from the work through the opening in said throat-plate, said means operating to release the clamped end when the sewing starts on the next buttonhole and before the relative movements of the throat-plate and the cutting and clamping parts have placed an appreciable strain on said clamped end.

In testimony whereof, I have signed my name to this specification.

FRANKLIN A. REECE.